United States Patent [19]

May

[11] 4,303,943

[45] Dec. 1, 1981

[54] ADAPTIVE ENHANCEMENT OF SIGNAL-TO-NOISE RATIO IN TELEVISION IMAGERY

[75] Inventor: Curtis L. May, San Pedro, Calif.

[73] Assignee: Magnavox Government & Industrial Electronics, Fort Wayne, Ind.

[21] Appl. No.: 133,606

[22] Filed: Mar. 24, 1980

[51] Int. Cl.³ .............................................. H04N 5/21
[52] U.S. Cl. .................................................. 358/167
[58] Field of Search ........................................ 358/167

[56] References Cited

U.S. PATENT DOCUMENTS

| | | | |
|---|---|---|---|
| 3,333,055 | 7/1967 | Krause | 358/167 |
| 3,564,129 | 2/1971 | Blaxtan | 358/167 |
| 3,602,737 | 8/1971 | Radecke | 307/231 |
| 3,621,401 | 11/1971 | Young, Jr. | 328/115 |
| 3,715,483 | 2/1973 | Limb et al. | 358/133 |
| 4,001,501 | 1/1977 | Weimer | 358/167 |
| 4,090,221 | 5/1978 | Connor | 358/166 |
| 4,107,736 | 8/1978 | Lowry et al. | 358/36 |
| 4,107,739 | 8/1978 | Rossi et al. | 358/167 |

Primary Examiner—Richard Murray
Attorney, Agent, or Firm—Christie, Parker & Hale

[57] ABSTRACT

A noise reduction filter for a television receiver in which two running averages of video signal amplitude are generated over regions of the video picture where the brightness level is substantially constant. One or the other of the averages is used to control intensity to obtain a reduction of random noise in the video signal. In areas of the picture where rapid changes in intensity occur, the averages are not used in favor of the unmodified video signal.

13 Claims, 5 Drawing Figures

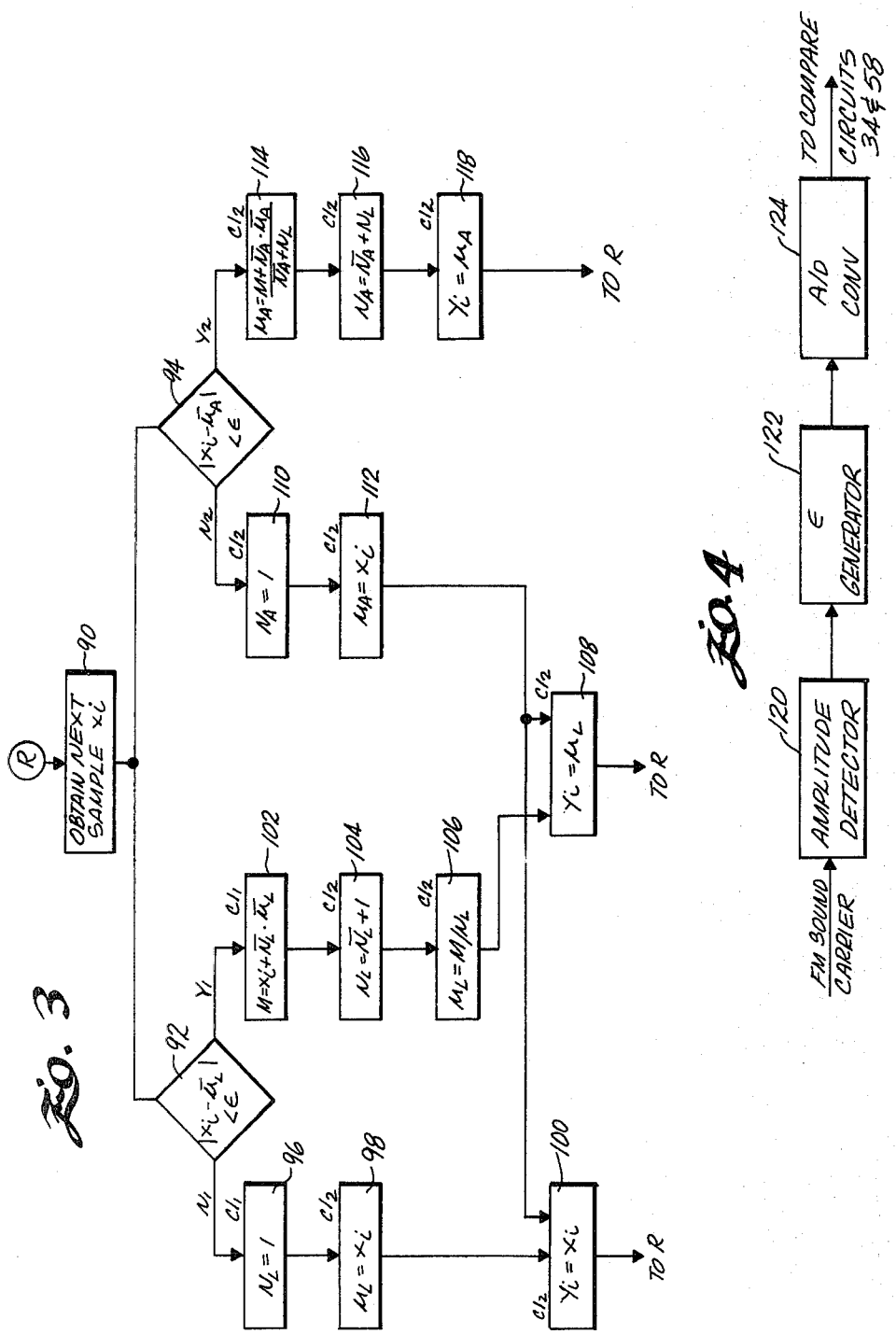

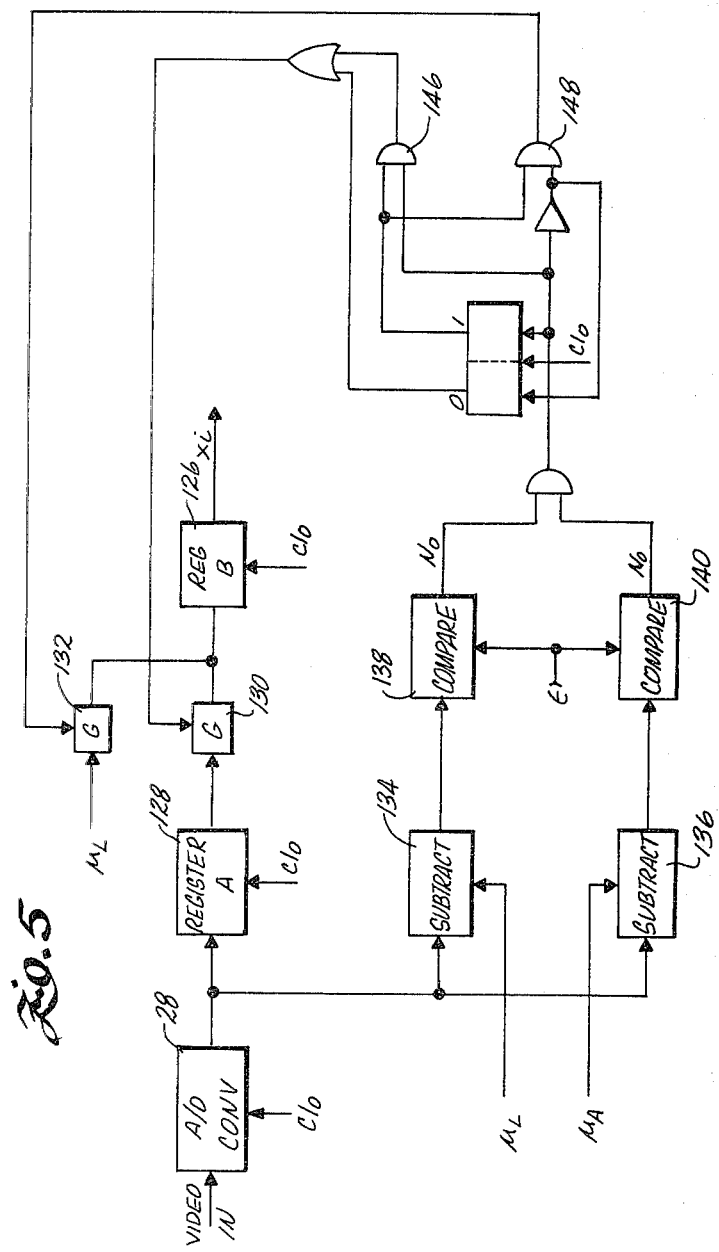

ADAPTIVE ENHANCEMENT OF SIGNAL-TO-NOISE RATIO IN TELEVISION IMAGERY

FIELD OF THE INVENTION

This invention relates to television receivers, and more particularly, to a video signal proccessor for enhancing the signal-to-noise ratio of the video image.

BACKGROUND OF THE INVENTION

Various techniques for reducing the effect of random noise on the quality of a television image have been proposed. Filtering or integrating circuits have been used, for example, but reduce contrast and picture definition. Systems have been proposed which compare information from frame to frame to evaluate motion and to change the integration constant of the filter to limit the filtering effect when picture content is changing more rapidly. In U.S. Pat. No. 3,009,016, for example, a noise reduction system is disclosed which attempts selective processing to suppress noise by taking advantage of the fact that noise is not as objectionable in picture regions of fine detail as compared to noise in regions of little or no contrasting detail, such as regions of uniform brightness. As described in the patent, a matrix of picture samples surrounding the sample being tested were used to develop average values in both the x and y directions. The differences between each picture sample and these averages were compared with a reference signal and if the differences exceeded the reference, the sample was transmitted without alteration. If no differences are exceeded, an average of all the samples in the matrix is substituted for the video signal.

The present invention, like the above-identified patent, takes advantage of the fact that noise in areas of high detail is less objectionable to the viewer than noise in areas of low detail. However, the present invention utilizes information derived from the region of the picture appearing above and to the left of the picture element being processed so that information on picture elements yet to be scanned in the same line or subsequent lines of the raster need not be available either from previous frames or by introducing delays of one or more lines.

SUMMARY OF THE INVENTION

In brief, the present invention provides a signal processor in which a running average of signal intensities is generated over picture regions where the brightness level is relatively uniform. In regions of rapidly changing brightness, the signal processor transmits the video signal without noise reduction to preserve all picture detail. However, in regions of semi-constant brightness, noise reduction is provided. The signal processor samples the incoming video signal and processes each sample in one of three ways to form a video output signal. Each input video sample is compared with two stored intensity averages. One average, a line average, is based on the average of previous samples along the current scan line while the other average, an area average, is based on all previous sample intensities in the region above and to the left of the current sample which fall within a region of substantially uniform intensity. Each sample intensity is compared with each of these averages. If the difference is within a predetermined value when compared with the current line average, the line average is updated and used as the output sample. If the current differs from the area average by a predetermined amount, the area average is updated and used as the current output sample. If the current sample differs from both averages by more than a predetermined amount, the current sample is used both as the output and to start a new line average.

BRIEF DESCRIPTION OF THE DRAWINGS

For a better understanding of the invention reference should be made to the accompanying drawings, wherein:

FIG. 3 is a detailed flow diagram showing the operation of the circuit of FIG. 2;

FIG. 4 is a block diagram of a modification of the circuit of FIG. 2; and

FIG. 5 is a block diagram of a further modification of the circuit of FIG. 2.

DETAILED DESCRIPTION

Figure 1:
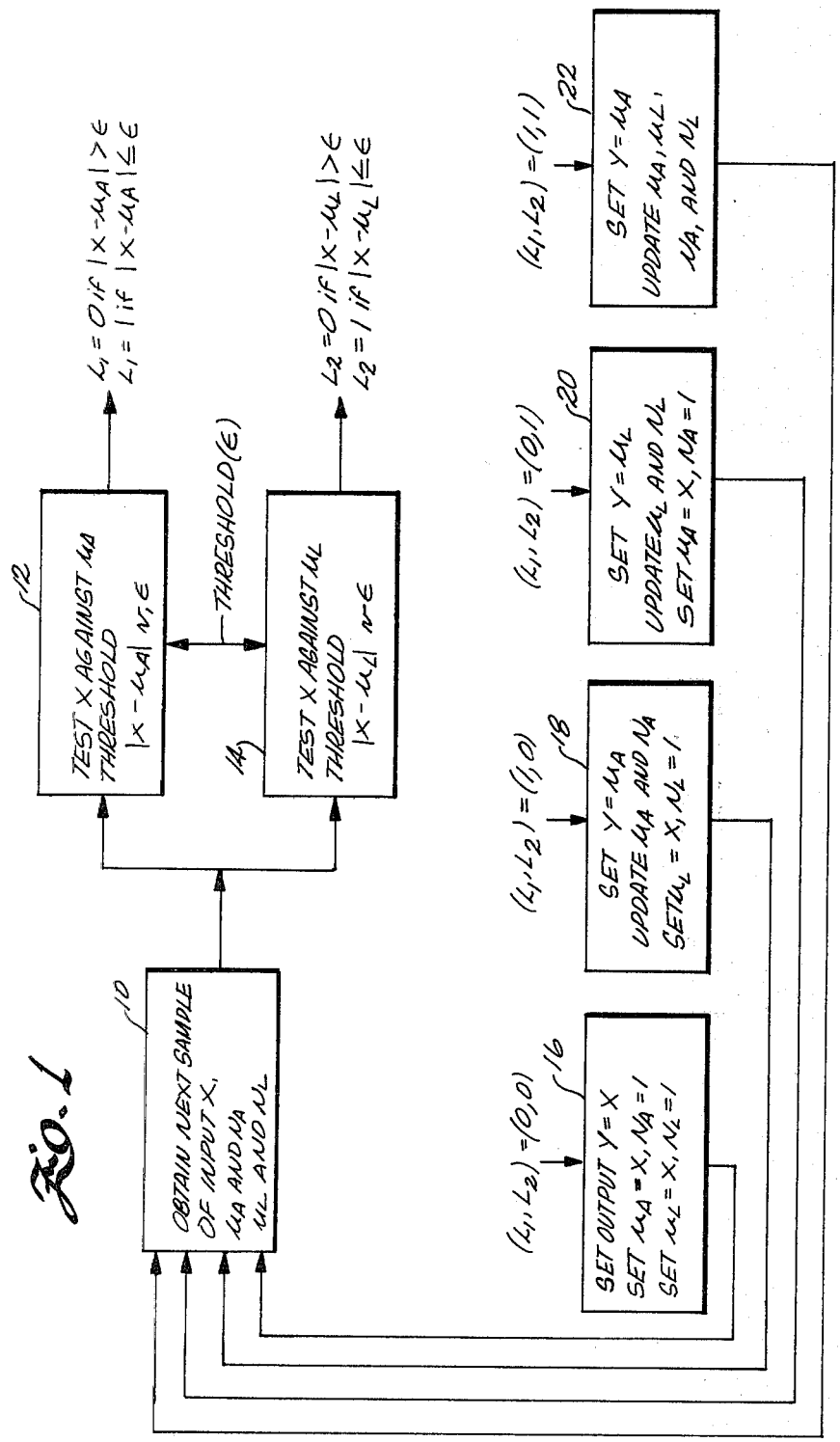
FIG. 1 is a basic flow diagram.

Referring to the basic flow diagram of FIG. 1, the operation of the processing circuit of the present invention for enhancement of the signal-to-noise ratio the processor operates in real time to sample the analog video signal. Each sample provides an input signal $x_i$ in which x corresponds to the instantaneous amplitude of the video signal. As indicated at 10, the input value x is obtained along with a stored value $\mu_A$, which is an average of $N_A$ prior samples representing an area of substantially constant intensity, and a stored value $\mu_L$, which is an average of $N_L$ prior samples in the same line which are of substantially the same intensity.

As described in detail below, the line average $\mu_L$ and sample count $N_L$ are obtained by continuously generating a running average of a succession of samples following the start of each line scan of the video image. As long as the succession of samples are within a predetermined threshold value of the line average, they are used to update the line average and the sample count $N_L$ is incremented. A separate area average $\mu_A$ is generated and stored with each sample in a line. The area average $\mu_A$ for each sample point in a line is a running average of the same number of samples in each previously scanned line, that is, a running average of the area above the horizontal line being scanned and to the left of the vertical line through the sample point. The area average is linked to samples that fall within a predetermined threshold of the running average. The running average $\mu_A$ associated with a particular sample in a line scan is terminated and a new average started when the particular sample is outside the threshold. As indicated at 12, the sample value x is compared with the two average values $\mu_A$ and $\mu_L$ to determine whether the sample falls within or without a threshold value $\epsilon$ of the two stored average values, $\mu_A$ and $\mu_L$.

As a result of these comparisons, four logical conditions may exist. The first condition, as indicated by the block 16, results from the sample differing from both averages by more than the threshold value $\epsilon$. In this case the level of the output signal y is made equal to the level of the input signal x. Both the average values, $\mu_A$ and $\mu_L$ are set to the level of the input signal x, and the number of samples in each of the averages, namely $N_A$ and $N_L$ are reset to one. The processing circuit is then ready to receive the next sample.

The usual condition occurs when the difference between the sample x and the average $\mu_A$ is less than the threshold value $\epsilon$ but the difference between the sample x and the line average $\mu_L$ is greater than the threshold $\epsilon$. As indicated by block 18, the average $\mu_A$ is then used as the output signal y, the average $\mu_A$ is updated by including the current sample in the average, and the number of samples $N_A$ is updated. However, the line average $\mu_L$ is set to the sample value x and the number of samples $N_L$ is reset to one.

A third condition occurs if the difference between the sample x and the area average $\mu_A$ is outside the threshold $\epsilon$ but the line average $\mu_L$ differs from the sample by less than the threshold $\epsilon$. As indicated by block 20, the average $\mu_L$ is then used as the output signal y. The line average $\mu_L$ is updated and the number of samples $N_L$ is increased by one, while the area average $\mu_A$ is set to the sample value and the number of samples $N_A$ is reset to one.

The fourth condition, as indicated by block 22, occurs if the differences between the sample x and both the averages $\mu_A$ and $\mu_L$ are within the threshold $\epsilon$. The average $\mu_A$ is then used as the output y and both averages and sample counts are updated. The average $\mu_A$ is used as the output rather than the average $\mu_L$ because it usually represents a larger number of samples.

Figure 2:
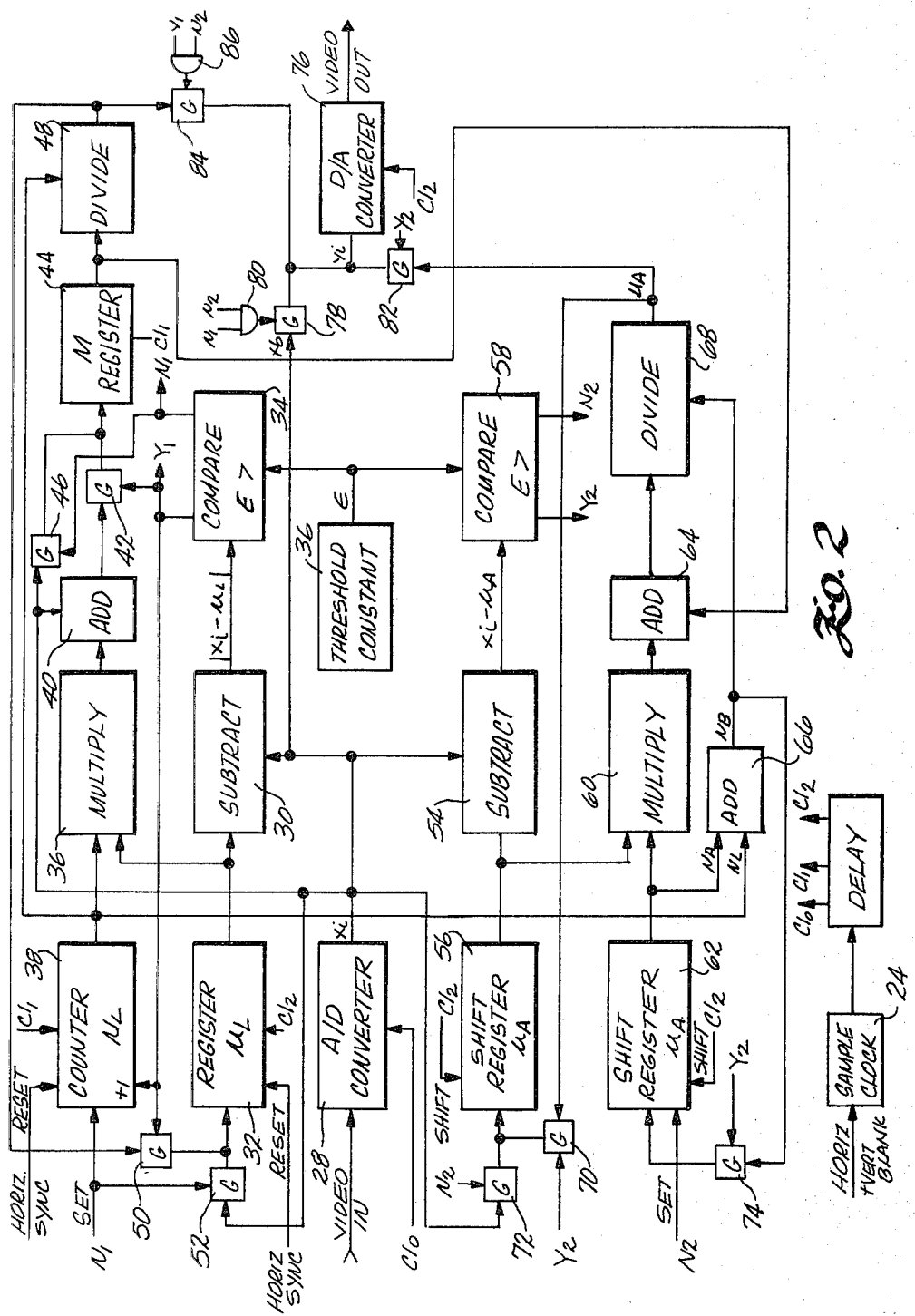
FIG. 2 is a schematic block diagram of the noise processing circuit of the present invention.

The video noise processing circuit is shown in detail in FIG. 2. In the preferred embodiment, the processor is implemented by digital circuits synchronized with a clock 24 which operates at the desired sampling rate, for example, a frequency of 14 megahertz. The output of the clock is applied to a delay circuit 26, which provides three clock signals $cl_0$, $cl_1$, and $cl_2$ at different times within one clock interval. The clock output is preferably blanked during the horizontal and vertical retrace intervals so that clock signals are generated only during the picture information portion of the television signal. The base band video signal following detection is applied as the video input to an analog-to-digital converter. 28. A digitized sample is generated with each $cl_0$. The output of the converter is the digitized sample $x_i$. This sample $x_i$ is applied as one input to a subtract circuit 30 together with the output of a storage register 32 which stores the line average value $\mu_L$. The output of the substract circuit 30 is applied as one input to a compare circuit 34 which compares the difference between $x_i$ and $\mu_L$ with a threshold constant $\epsilon$ from a threshold constant generator 36. If the threshold value is greater than the difference, the new sample $x_i$ is within the window $+-\epsilon$ relative to the line average $\mu_L$. In this case, the compare circuit makes the output $Y_1$ go true. If the sample $x_i$ exceeds the threshold relative to the line average $\mu_L$, the compare circuit makes the output $N_1$ go true.

To obtain a new average $\mu_L$ the current average valve $\mu_L$ from the register 32 is applied as one input to a multiplier circuit 36 together with the output of a counter 38 which stores the prior number of samples $N_L$ represented by the current average value $\mu_L$. The product $N_L \cdot \mu_L$ is added to the new sample value $x_i$ by an adder 40. If the compare circuit 34 indicates that the sample $x_i$ is within the threshold relative to the line average $\mu_L$ ($Y_1$ is true), the output of the adder 40 is gated by means of a gate 42 to an M register 44 at clock time $cl_1$. The counter 38 is also counted up by one at clock time $cl_1$ indicating that a new sample is to be added to the line average $\mu_L$. The new line average $\mu_L$ is generated by a divide circuit 48 which divides the value in the M register 44 by the new value of $N_L$ in the counter 38. The output of the divide circuit 48 is the new line average value $\mu_L$ and is stored in the register 32 through a gate 50 by the output $Y_1$ of the compare circuit 34 at clock time $cl_2$.

If the sample $x_i$ is not within the threshold ($N_1$ is true), the sample value $x_i$ is gated to the M register through a gate 46 at clock time $cl_1$ and the counter 38 is set back to $N_L=1$. At clock time $cl_2$ the register 32 is set to the sample valve $x_i$ through gate 52. Thus whenever a sample $x_i$ is within the window provided by the threshold value $\epsilon$ relative to the line average $\mu_L$, the average value $\mu_L$ is updated and the sample number $N_L$ is incremented. Whenever the sample value $x_i$ is not within the window, the average $\mu_L$ is set to the new sample value $x_i$ and the sample number $N_L$ is reset to one, thus starting the line averaging process over again.

The sample $x_i$ is also applied to a subtract circuit 54 together with the output of a shift register 56 which stores a plurality of sample values $\mu_A$. The number of values stored in the shift register 56 corresponds to the number of samples in one complete horizontal line of the video signal. The shift register 56 is shifted with each new sample from the output of the converter 28 by a clock pulse $cl_2$. Thus the subtract circuit 54 substracts the area average value for the particular sample from the current sample value $x_i$. The difference output from the subtract circuit 54 is applied to a compare circuit 58 which determines whether or not the difference is within the threshold value $\epsilon$. If so, the compare circuit 58 makes the output $Y_2$ go true. If not, the compare circuit makes the output $N_2$ go true.

The area average $\mu_A$ is applied as one input to a multiplier 60 together with the output of a shift register 62 which stores the number of samples $N_A$ represented by the corresponding area average $\mu_A$. The shift register 56 and 62 are shifted in unison and store the same number of words. The output of the multiplier 60 is applied to an adder 64 together with the output of the M register 44. At the same time, the output of the counter 38 and the shift register 62 are applied to an adder 66 to obtain the sum of the number of samples $N_L$ in the line average $\mu_L$ and the number of samples in the prior area average $\mu_A$. The total number of samples, indicated as $N_B$, is applied as a divisor to a divider circuit 68 to which the output of the adder 64 is applied as the dividend. The output of the divider 68 is a new computed area average $\mu_A$.

During clock time $cl_2$ the shift registers 56 and 62 are shifted to the right to provide the next value of $\mu_A$ and $N_A$ at the output for comparison with the next sample. If the compare circuit 58 indicated that the current comparison was within the threshold, the new computed average $\mu_A$ is gated into the shift register 56 through a gate 70 from the divider 68. However, if the compare circuit 58 indicates that the current sample is not within the threshold, the sample value $x_i$ is gated into the register 56 through a gate 72. Similarly, the new sample number $N_B$ is gated into the shift register 62 through a gate 74 by $Y_2$ if the comparision is within the threshold, but the sample number is reset to one by $N_2$ if the current sample was not within the threshold.

Also, at clock time $cl_2$ either the new line average $\mu_L$ at the output of the divide circuit 48, the new area average $\mu_A$ at the output of the divide circuit 68, or the current sample $x_i$ is transferred to a digital-to-analog converter 76 for generating the video output analog signal for modulating the intensity of image-forming cathode ray beam. As discussed above in FIG. 1 if the current sample is not within the threshold of either the prior line average $\mu_L$ or the area average $\mu_A$, the current sample $x_i$ is used to generate the output. To this end, a gate 78 controlled by an AND circuit 80 gates the current sample directly to the converter 76 when both the compare circuits 34 and 58 indicate the current sample is not within the threshold of either average. If the current sample is within the threshold of the area average $\mu_A$, regardless of whether it is within the line average $\mu_L$, the newly computed area average $\mu_A$ at the output of the divider 68 is applied to the converter 76 through a gate 82 in response to the $Y_2$ output of the compare circuit 58. Finally, if the current sample $x_i$ is within the threshold of the line average $\mu_L$, as indicated by the output $Y_1$ from the compare circuit 34 but not within the threshold of the area average $\mu_A$ as indicated by the output $N_2$ from the compare circuit 58, the line average $\mu_L$ is used as the output. This is provided by means of a gate 84 controlled by an AND circuit 86.

The operation of the processing circuit of FIG. 2 is best summarized by reference to the flow diagram of FIG. 3 which shows all the operations that take place during one clock interval. The next sample $x_i$ is generated by $cl_0$, as indicated at 90. A comparison is made to determine whether the difference between the line average $\mu_L$ and the sample is within the threshold $\epsilon$, as indicated at 92. A comparison is also made to determine whether the difference between the sample and the even average $\mu_A$ for the particular sample is within the threshold $\epsilon$, as indicated at 94. If the difference is not within the threshold, at clock time $cl_1$, the sample $N_L$ is set to one. See 96 in FIG. 3. At clock time $cl_2$, the stored line average $\mu_L$ is set to the new sample value $x_i$. See 98 in FIG. 3. Finally, if the difference between the sample and the area average $\mu_A$ is also not within the threshold, the area average $\mu_A$ is set equal to the value of the sample $x_i$, the output $y_i$ is made equal to the input sample $x_i$ (see 100) and operation returns to process the next sample.

If the comparison at 92 indicates that the difference between the sample and the line average $\mu_L$ is within the threshold, the M register is set to the sum of the sample $x_i$ and the product of the prior line average $\overline{\mu_L}$ times the prior number of samples in the line $\overline{N_L}$ at clock time $cl_1$. Also at clock time $cl_1$ $N_L$ is incremented by 1. any new line average $\mu_L$ is stored by dividing M by the new value of $N_L$ at clock time $cl_2$ as indicated at 106 in FIG. 3. If, in addition, the difference between the sample and the area average $\mu_A$ is not within the threshold, the output $y_i$ is made equal to the new line average $\mu_L$ as indicated at 108.

If the comparison at 94 shows the difference between the sample and the area average is not within the threshold, the stored value of $N_A$ is set equal to one and the stored area average $\mu_A$ is set to the sample value $x_i$ at clock time $cl_2$ as indicated at 110 and 112. Finally, if the difference between the sample and the area average $\mu_A$ is within the threshold, a new value for $\mu_A$ is computed and stored in register 56, as indicated at 114 in FIG. 3. The sample number $N_A$ is updated by adding the current number of line samples $N_L$ to the prior number of samples $\overline{N_A}$, as indicated at 116. The new area average $\mu_A$ is then applied to the output $y_i$, as indicated at 118.

It should be noted that the value of $N_L$ stored in the counter 38 and the value of $\mu_L$ stored in the register 32 is reset by each line horizontal sync pulse, so that a new average is accumulated with each new line scan. This is not true of the area average $\mu_A$. Each area average $\mu_A$ stored in the shift register 56 is, in effect, the average of all the samples of the current line scan up to the sample point taken with the average of the corresponding line scans for all the previous lines up to the same point that fall within the threshold. In other words, the area average is the average of all samples in an area extending above the horizontal line through the sample point and extending to the left of a vertical line through the sample point. Thus the area average represents the average of all sample points within a contiguous area extending to the left and above the sample point which has a uniform intensity falling within the threshold.

Whenever a new sample falls outside both the area average and the line average, the sample $x_i$ is stored as the new average values $\mu_L$ and $\mu_A$ and the averaging process is started anew. It should be noted, however, that the area average for all the other sample points along the line are not involved in this process until each area average value $\mu_A$ is read out in sequence from the shift register with successive samples. Thus the system accommodates vertical discontinuities by retaining the area averages for the region of the picture to the left of the discontinuity and generating different area averages for the region to the right of the vertical discontinuity.

An important consideration in the operation of this circuit is in the selection of the threshold value $\epsilon$. If $\epsilon$ is made too large, a significant amount of low amplitude picture detail could be lost in areas of small variations in intensity due to the averaging process. On the other hand, if the threshold is made too small, the improvement in the signal-to-noise ratio could be all but lost. Preferably the value of $\epsilon$ is set so that noise samples exceeding the threshold are of the order of two and one-half times the level of the white Gaussian noise. FIG. 4 shows an arrangement for the threshold constant circuit 36 of FIG. 2 which provides a variable threshold value $\epsilon$ as a function of the incoming signal-to-noise ratio. In the arrangement of FIG. 4, variations in the amplitude of the r-f carrier for the frequency modulated audio are used to measure the noise level, since fluctuations in amplitude of the sound carrier are directly due to noise in the transmission. The FM sound carrier is applied to an amplitude detector 120 to provide an output signal which varies with changes in the noise level. This signal is used to control the output of the threshold generator 122 to provide a variable threshold signal $\epsilon$ which is then digitized by an analog-to-digital converter 124 and applied to the compare circuits 34 and 58 of FIG. 2.

One limitation of the noise processor is that the running averages may be reset by a noise sample exceeding the threshold, particularly when the threshold is kept small enough to maintain low level signal fidelity. FIG. 5 shows a modification to the processor of FIG. 2 which operates to reject random noise spikes. The effect of the circuit of FIG. 5 is to look ahead at the next sample to determine whether a given sample exceeding the threshold is due to an actual video signal change or is produced by a random noise pulse. If a random noise pulse, the sample is discarded and a line average value $\mu_L$ is substituted in its place.

As shown in FIG. 5, the current sample is stored in a register 126 and provides the sample value $x_i$ used at the input of the processor circuit of FIG. 2. The digitized sample stored in register 126 is either derived from the analog-to-digital converter 28 through an intermediate register 128 and gate 130 or is derived from the register 32 through a gate 132. The register 28 provides a look ahead of one sample while analog-to-digital converter 28 provides a look ahead of two samples. Transfer occurs once each clock interval. The decision of whether a sample is to be used or discarded is made while the sample is stored in the register 128. To this end the circuit looks ahead to the next sample which appears at the output of the analog-to-digital converter 28. This sample is applied to two subtract circuits, 134 and 136, which derive the difference between the sample and the line average $\mu_L$ and the area average $\mu_A$, respectively. These difference values are applied to one input of associated compare circuits 138 and 140, which compare the respective difference values with the threshold value $\epsilon$. If the sample value in the converter 28 is outside the threshold, a flip-flop 142 is set by the next clock in response to the output of AND circuit 144. The same clock transfers the sample from the converter 28 to the register 128 and generates a new sample in the converter 28. If the new sample is also outside the threshold, it is assumed that the sample in register 128 is not a noise spike but represents a change in intensity of the transmitted picture. This is sensed by an AND circuit 146, the output of which is applied to the gate 130, permitting the sample in the register 128 to be transferred to the register 126 with the next clock.

In the event the next sample, as present in the converter 28, is within the threshold of both averages, it is assumed that the sample in the register 128 is a random noise spike. This condition is sensed by AND circuit 148, the output of which operates a gate 132, causing the line average value $\mu_L$ to be transferred to the register 126 rather than the noise sample stored in the register 128. At the same time the flip-flop 142 is reset, allowing the sample in the converter 28 to be transferred to the register 128 and then to the register 126 by successive clock pulses. Thus individual samples which are outside the threshold for both averages are discarded in favor of the stored line average $\mu_L$, but when at least two samples in succession are outside the threshold they are processed to produce new averages.

While the processor circuit of FIG. 2 is described as the preferred embodiment of the invention, it will be understood that various modifications to the circuit are possible. Thus, although a digital processor is preferred, the circuit of FIG. 2 can be implemented entirely in analog form. Also, since the most time-consuming operations are the multiplies and divides, these circuits could be replaced by simpler left and right shifts of the respective registers. In a binary system this can be done by always making $N_A$, $N_L$ and $N_B$ equal to the nearest power of two. It can be shown that if each divide or multiply were performed using the closest power of two to the actual count, the worst case processing gain reduction would be less than 3 DB. This modification would greatly simplify the processing operation and greatly improve the time demands on the circuit design.

What is claimed is:

1. Apparatus for enhancing the signal-to-noise ratio of a video signal having a horizontal line rate and a vertical frame rate comprising:
    means sampling the amplitude of the video signal at a rate substantially higher than the line rate, means responsive to each successive sample for generating a line average signal whose magnitude is the average of prior samples, means storing the line average signal, means comparing the next successive video signal sample with the stored line average signal, means replacing the stored line average signal with said next successive video signal sample when the magnitude of the sample differs from the stored line average signal by a predetermined amount, storing means storing a group of area average signals, one area average being stored for each sample in one complete horizontal line, means comparing the next successive video signal sample with the corresponding previously stored area average signal in said area sample storing means, and means responsive to said comparing means for replacing the area average signal in the storing means with said next successive video signal sample when the magnitude of the video signal sample differs from the stored average area signal by a predetermined amount.

2. Apparatus of claim 1 wherein said means generating a line average includes means counting successive samples of the video signal, means storing the average of prior samples, first multiplier means for generating the product of the stored line average and the count of the counting means, first adder means adding the sample to the output of the multiplier means, and first divider means dividing the output of the adder means by the count of the counting means to generate a new line average.

3. Apparatus of claim 2 further comprising means for starting a new line average including means resetting the counting means and means replacing the stored line average with the video sample.

4. Apparatus of claim 1 wherein said means generating an area average includes means separately storing the area average values for each sample of a complete line of the video signal, and means separately storing the number of samples for each respective area average.

5. Apparatus of claim 4 wherein said means generating an area average includes means storing the number of samples included in the area average, second multiplier means for generating the product of the stored area average associated with a particular sample and the stored number of samples, second adder means adding the output of the first adder means and the output of the second multiplier means, third adder means adding the count of the counting means to said stored number of samples, and second divider means dividing the output of the second adder by the output of the third adder to generate a new area average.

6. Apparatus for reducing noise in a received video signal for generating a video image by successive scan lines, comprising:
    means responsive to the instantaneous amplitude of the video signal at successive sample times for generating a series of digitally coded sample signals corresponding to said amplitude, means receiving said sample signals for generating and storing a digitally coded line average signal corresponding to the average amplitude of prior samples in the same line, first comparing means for comparing the line average signal with the next successive sample signal, means responsive to the comparing means when the sample signal is within a predetermined threshold relative to the line average signal for updating the line average signal with the sample signal, means responsive to the first comparing means when the sample signal is not within a predetermined threshold relative to the sample signal for substituting the sample signal for said stored line average signal, means receiving said sample signals for generating and separately storing digitally coded area average signals corresponding to the average amplitude of the line average signal for the corresponding number of samples in the prior lines, second comparing means for comparing the stored area average signal for each sample with the next successive sample signal, means responsive to the comparing means when the sample signal is within a predetermined threshold reative to the area average signal for updating the area average with the current line average signal, means responsive to the second comparing means when the sample signal is not within the threshold relative to the area average signal for substituting the sample signal for said stored area average signal, a video output, and means responsive to the first and second comparing means for connecting the sample signal to the output when the sample is not within the threshold relative to both the line average signal and the area average signal.

7. Apparatus of claim 6 further including means responsive to the first and second comparing means for connecting an updated average signal to the output when the sample is within the threshold relative to either the area average or line average signals.

8. Apparatus of claim 7 further including means for storing two successive samples of the video signal, and third comparing means comparing the second of said two samples with the stored line average signal and area average signal, means responsive to the third comparing means for transferring the first of the two stored samples to said means receiving the sample signals when the second of the two samples is not within the threshold relative to both the line average and the area average signals.

9. Apparatus of claim 7 including means for varying said threshold with changes in the noise level of the received video signal.

10. Apparatus for enhancing the signal quality of television images generated from a composite amplitude modulated video signal having horizontal sync signals defining the start of each horizontal scan line of the image, said apparatus comprising means sampling the video signal at a predetermined sampling rate, means generating a running line average of the samples in each line starting with each horizontal sync signal, first comparing means comparing each sample with the running average of the prior samples in the same line, means starting a new running line average with each sample that exceeds the prior running line average by a predetermined threshold amount, means responsive to each sample for generating a separate running area average for each sample of a line with the corresponding number of samples in a plurality of prior lines, second comparing means comparing each sample with the running area average, means starting a new running area average with each sample that exceeds its corresponding running area average by a predetermined threshold amount, means responsive to successive samples for generating a video output signal, means responsive to the comparing means when a sample is not within the threshold of either the line average or the area average for connecting the samples directly to the means for generating a video output signal, means responsive to the comparing means when a sample is within the threshold of the area average for connecting the corresponding area average to the means for generating a video output signal, and means responsive to the comparing means when a sample is within the threshold of the line average but not the area average for connecting the line average to the means generating a video output signal.

11. In a television receiver or the like for producing visual images from a video signal by producing a line by line and frame by frame scan, signal processing apparatus receiving the video signal for reducing noise in the video output signal of the processing apparatus comprising:

sample means for generating successive amplitude samples of the video signal input, means generating a running line average of the samples starting with each new line, means separately storing the line average generated with each successive sample in a line, means averaging each line average with the line average of the corresponding number of samples in all prior lines starting with each new frame, to provide an area average, means comparing each sample with the prior line average and area average, and means responsive to the comparing means for connecting the sample from the sample means to the output only when the sample is not within a threshold relative to both the averages.

12. Apparatus of claim 11 further including means responsive to the comparing means for connecting the area average to the output when the sample is within the threshold relative to the area average.

13. Apparatus of claim 12 further including means responsive to the comparing means for connecting the line average to the output when the sample is within the threshold relative to the line average but not within the threshold relative to the area average.

* * * * *

UNITED STATES PATENT AND TRADEMARK OFFICE
CERTIFICATE OF CORRECTION

PATENT NO. : 4,303,943
DATED : December 1, 1981
INVENTOR(S) : Curtis L. May

It is certified that error appears in the above-identified patent and that said Letters Patent are hereby corrected as shown below:

Col. 3, line 56, "valve" should read -- value --.

Col. 4, line 10, "valve" should read -- value --.

Col. 5, line 46, "any" should read -- Any --.

Col. 9, line 9, "reative" should read -- relative --.

Signed and Sealed this

Twenty-fourth Day of August 1982

[SEAL]

Attest:

Attesting Officer

GERALD J. MOSSINGHOFF

Commissioner of Patents and Trademarks